May 29, 1945.  A. B. SPERRY ET AL  2,377,276

ELECTRIC CLOCK

Filed Nov. 22, 1941   3 Sheets-Sheet 1

ARTHUR B. SPERRY
NICHOLAS NAZAR & WILLIAM C. ERWIN INVENTORS

BY Philip Colman

ATTORNEY

May 29, 1945.  A. B. SPERRY ET AL  2,377,276
ELECTRIC CLOCK
Filed Nov. 22, 1941  3 Sheets-Sheet 2
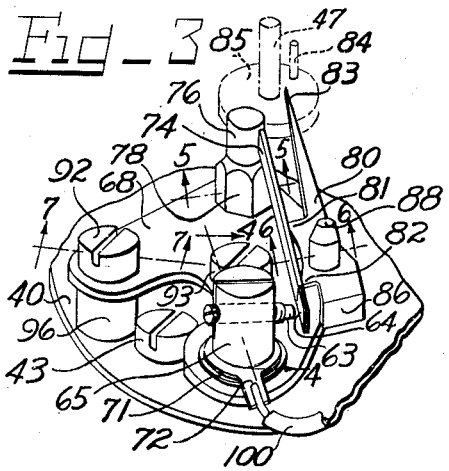
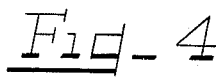
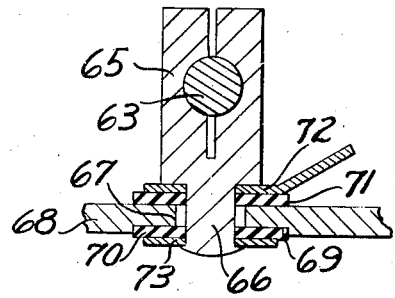
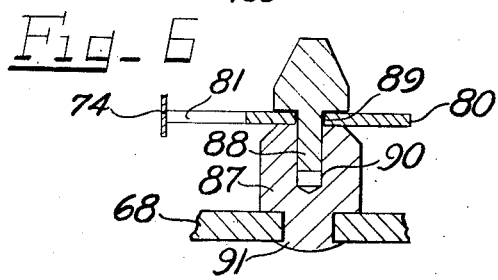
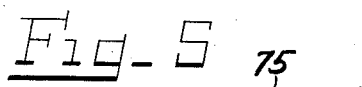
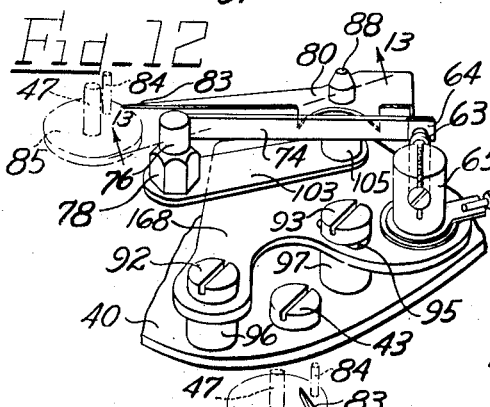
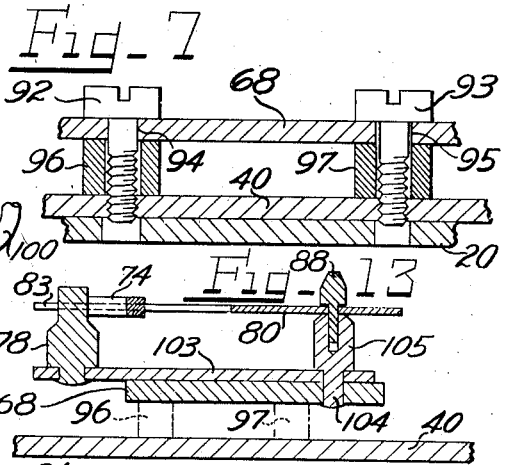
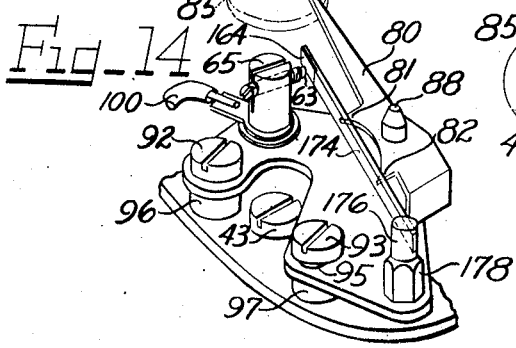
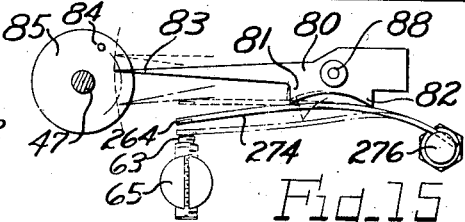
ARTHUR B. SPERRY
NICHOLAS NAZAR & WILLIAM C. ERWIN INVENTORS
BY Philip Colman
ATTORNEY

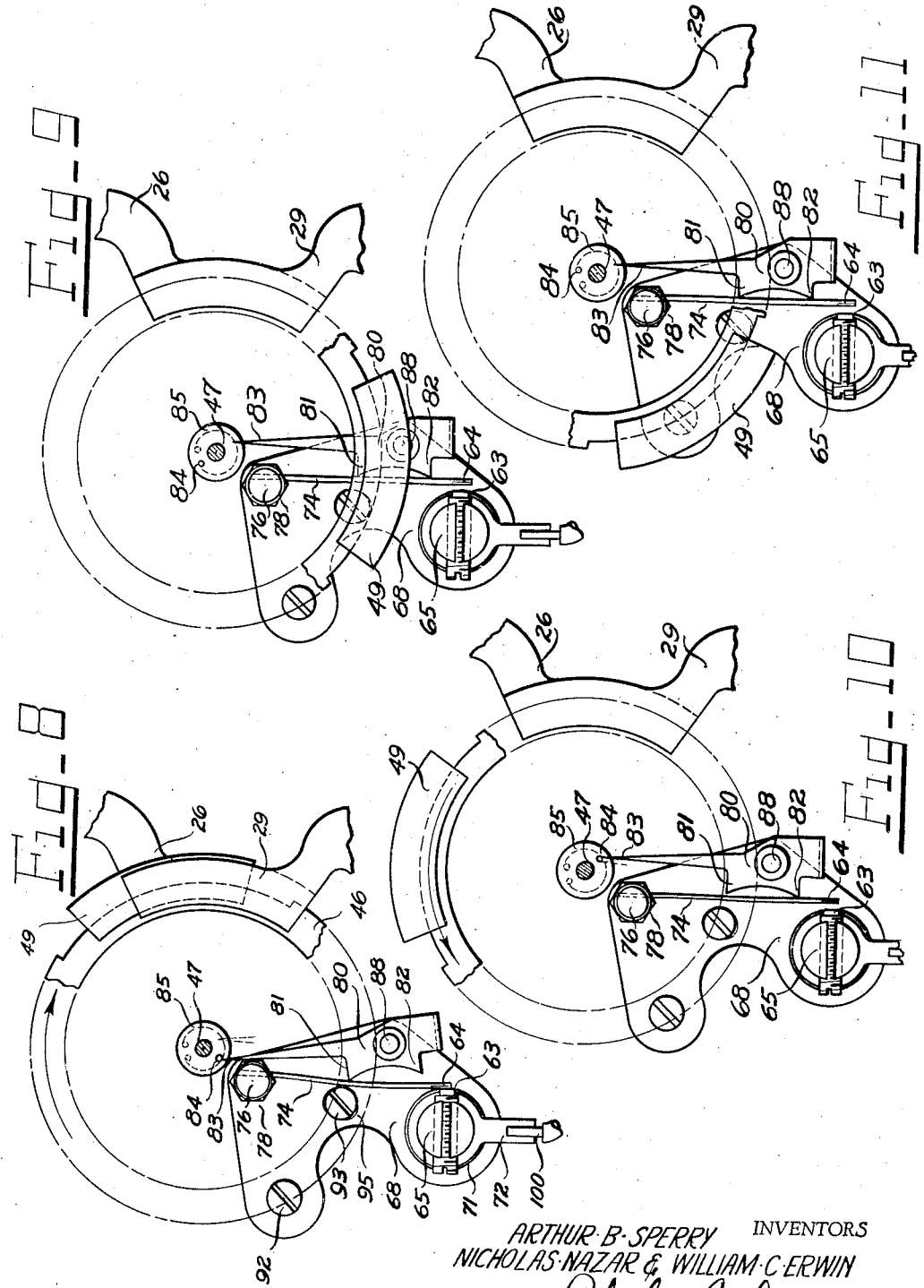

Patented May 29, 1945

2,377,276

UNITED STATES PATENT OFFICE 2,377,276

ELECTRIC CLOCK

Arthur B. Sperry, Watertown, Nicholas Nazar, Newton, and William C. Erwin, Waltham, Mass., assignors to Waltham Watch Company, Waltham, Mass., a corporation of Massachusetts Application November 22, 1941, Serial No. 420,096

16 Claims. (Cl. 58—28)

The present invention relates to electric clocks or other time-keeping devices wherein an oscillating element is maintained in motion by electromagnetic means intermittently energized through an electrical contact system controlled by the oscillatory movement of said element.

Among the objects of the present invention is the provision of an improved electric clock or the like having an electrical contact system which will insure self-starting, which will always afford relatively substantial contact pressures combined with free action of the oscillating element, which gives quick and certain closing and opening of contacts with clean make and break action, which does not permit any free vibration of electrical contacts, which will not adversely affect or disturb the time rate of the clock, which is exceptionally reliable in operation, which is of durable and sturdy construction, simple in design and easy to construct, assemble and adjust, and which permits of relatively wide latitudes in manufacturing tolerances.

Other objects will appear more fully from the following detailed description, accompanying drawings and appended claims.

For the purpose of illustrating the invention, there are shown in the accompanying drawings forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the drawings, wherein like reference characters indicate like parts:

Figure 3 represents an enlarged perspective view of the circuit-controlling contact assembly portion of the movement illustrated in Figures 1 and 2.

Figure 4 represents an enlarged cross-sectional view through the insulated live contact post, taken on line 4—4 of Figure 3, looking in the direction of the arrows.

Figure 5 represents an enlarged cross-sectional view through the grounded anchorage post in which one end of the contact spring is secured, taken on line 5—5 of Figure 3, looking in the direction of the arrows.

Figure 6 represents an enlarged cross-sectional view through the fulcrum point of the auxiliary lever and juxtaposed spring, taken on line 6—6 of Figure 3, looking in the direction of the arrows.

Figure 7 represents an enlarged cross-sectional view through the contact-assembly plate-securing screws, taken on line 7—7 of Figure 3, looking in the direction of the arrows.

Figure 8 represents an enlarged plan view of the contact assembly of Figure 1, but showing the component parts (originally shown in Figure 1 in the at-rest position) an instant after current has been applied, and just as the lever-actuating pin is about to release the tip of the lever on its clockwise circuit-closing stroke.

Figure 9 is a similar view but showing the lever-actuating pin and associated balance wheel at the end of the clockwise stroke, and the lever tip in its neutral position with the contacts open.

Figure 10 shows the parts on the return or counter-clockwise stroke of the pin, just as the latter is about to escape past the tip of the lever in this reverse direction; the contact spring then being at the point of maximum deflection on the return stroke.

Figure 11 shows the position of the parts at the end of the counter-clockwise stroke of the pin, the tip of the lever having returned to its neutral position with the contacts still remaining open.

Figure 12 represents an enlarged perspective view of a modified circuit-controlling contact assembly.

Figure 13 represents an enlarged cross-sectional view taken on line 13—13 of Figure 12, looking in the direction of the arrows.

Figure 14 represents an enlarged perspective view of still another modified circuit-controlling contact assembly.

Figure 15 represents a plan view of the contact assembly of Figure 14, but showing the contact spring bowed to a much greater extent.

Figure 1:
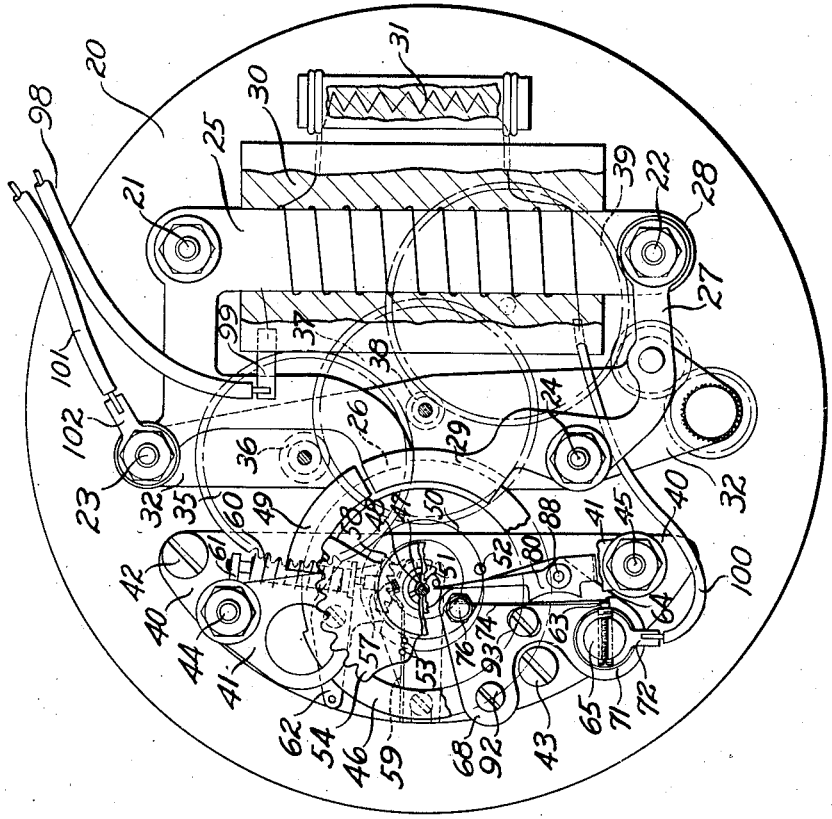
Figure 1 represents an enlarged view looking at the back of a clock movement constituting one illustrative embodiment of the present invention, the movable parts being shown at rest and prepared to self-start upon the application of current; portions of the movement being broken away to reveal underlying details of construction.
Figure 2:
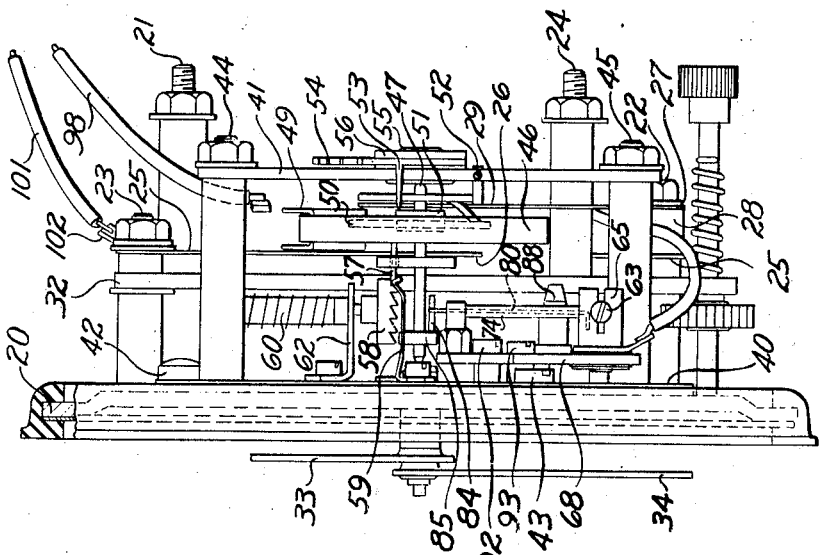
Figure 2 represents a view looking at the left side of the movement illustrated in Figure 1.

In the accompanying drawings the present invention has been shown embodied in a clock movement designed to be driven from any suitable relatively low-voltage source of direct current, as may be found for example in the electrical systems of internal combustion engines, or which may be derived from wet or dry cells, thus adapting the clock movement for use in automobiles, aircraft, or on desks, etc. It is to be distinctly understood, however, that the invention is not limited to time-indicating clocks powered from low-voltage direct current sources, but may be embodied in any electrical time-measuring or time-keeping device wherein an electrical circuit is intermittently made and broken.

Referring to the particular embodiment of the present invention illustrated in Figures 1 to 7 inclusive, all the movement parts are directly or indirectly mounted on a pillar plate 20 which may bear four rigid pillars 21 to 24 respectively. These pillars may fix and support the electromagnet assembly, comprising the magnetizable core-piece 25 terminating in an arcuately-shaped pole piece 26, the relatively shorter piece 27 having one end magnetically coupled to an end of said core-piece 25 through a magnetizable bushing 28 and terminating at its other end in an arcuately-shaped pole-piece 29 spaced from and paralleling pole-piece 26, and a magnetizing field coil 30 and parallel-connected resistor 31. Core-piece 25 may be supported by pillars 21 to 23, while piece 27 may be supported by pillars 22 and 24.

Pillars 23 and 24 may also support a gear train bridge 32 between the lowermost pole-piece 26 and pillar plate 20, in spaced parallel relation to the latter. The clock hour and minute hands 33 and 34 may be rotatably driven through the gear train including a worm-driven wheel 35 whose pinion 36 meshes with a center wheel 37, the latter frictionally driving a co-axial cannon-and-setting pinion 38 which meshes with the minute wheel 39. The arbors of the worm and center wheels 35 and 37 may extend between and be journalled in the pillar plate 20 and the train bridge 32. The shaft of minute wheel 39 may be journalled solely in the pillar plate 20, passing completely therethrough and having affixed thereto on the opposite side of said plate a pinion (not shown) meshing with an hour-hand gear (not shown). Minute-hand 34 may be mounted on the arbor of center-wheel 37, while hour-hand 33 may be mounted on a bushing co-axial with said center-wheel arbor.

The clock balance assembly may be supported between spaced lower and upper balance-bridges 40 and 41, lower-bridge 40 being detachably affixed against one side of pillar plate 20 by screws 42 and 43, and upper-bridge 41 (only fragmentarily shown in Figure 1) being fixedly held in spaced parallel relation thereto by pillars 44 and 45 rigidly secured to and extending from lower-bridge 40.

The balance assembly may include a balance-wheel 46 made of non-magnetic material, mounted on a staff 47 whose opposite ends are preferably journalled in jewel-bearings 48 located in the upper and lower balance-bridges 41 and 40. Affixed to balance-wheel 46 in a recessed portion of its periphery is an arcuately-shaped magnetically-attractable armature 49, which may be channel-shaped in cross-section. As balance 46 oscillates to and fro, its armature 49 passes between the spaced arcuately-shaped pole-pieces 26 and 29, periodically coming within magnetic range thereof. By intermittently completing the electrical circuit through the magnetizing coil 30 at the proper times, the pole-pieces 26 and 29 will be intermittently magnetically energized to attract the moving balance armature 49 as the latter comes within effective magnetic range of the pole-pieces. Through means to be described in detail hereinafter, the oscillatory movement of balance 46 intermittently makes and breaks the coil circuit; the parts being so arranged that the coil circuit is completed and the pole-pieces momentarily energized when armature 49 comes within effective range of said pole-pieces from only one direction, thereby magnetically to impart a driving impulse to the balance-wheel only in its one direction of movement, and the circuit then being broken and the pole-pieces de-energized before they have any opportunity to exert a retarding influence on the armature which continues to move past said pole-pieces. The armature then comes to rest at the end of its forward stroke, describes its return stroke, comes to rest, and then again enters on its forward stroke before the circuit is again completed.

A spiral hairspring 50, preferably made of some temperature-compensating alloy to avoid temperature-induced rate changes, may have its innermost end fixedly secured in a rotatably-adjustable collet 51 frictionally mounted on the balance staff 47, while its opposite outermost end may be anchored in a downwardly-depending pin 52 removably secured in the upper balance-bridge 41. The outermost overcoil portion of hairspring 50 may pass between a pair of parallel taper pins 53 extending downwardly from a rotatably-adjustable toothed regulator-rack 54, which may be frictionally mounted on the upper jewel-bushing 55 located in the upper bridge 41. Rack 54 may be secured against separation from jewel-bushing 55 by any suitable means, as for example by a washer 56 staked to said jewel-bushing. By engaging the toothed arcuate periphery of regulator-rack 54 with some suitable pinion tool and then rotating said tool, the position of the hairspring-contacting pins 53 may be rotatably adjusted at will to vary the effective length of hairspring 50 and with it the time-rate of the clock.

The oscillatory movements of balance-wheel 46 may be converted into uni-directional rotational movement of gear-train elements by means such as those more fully described and claimed in Fink patent application Serial No. 306,658. Briefly, driving pawl 57 oscillating with balance 46 rotatably advances the crown ratchet wheel 58 one tooth per clockwise stroke, the advance being aided by the co-action of the inclined outer end of a detent spring 59 with the teeth of the ratchet wheel. On each return or counter-clockwise stroke of the balance, pawl 57 rides back idly over the juxtaposed ratchet tooth which is held against retrograde movement by detent 59, pawl 57 flexing inwardly as it does so. The to-and-fro oscillatory movement of the driving pawl 57 is thus converted into intermittent uni-directional rotational movement of the crown ratchet wheel 58. This latter wheel may be directly connected with a worm 60 which is journalled between a lug 61 and a bracket 62 on the lower balance-bridge 40, and which meshes with wheel 35 of the clock gear train.

The circuit through the field coil 30 may be controlled by a pair of relatively movable contact elements 63 and 64, the former being the "live" contact insulated from the movement frame when the contacts are open, and the latter being grounded to said frame. As most clearly shown in Figures 3 and 4, live contact 63 may comprise a relatively fixed element, screwed into an upstanding notched post 65. The rear or inoperative end of contact element 63 may be slotted to receive the end of a screw-driver, whereby it may be rotatably screw-threadedly advanced or retracted in post 65 to adjust the gap between the contacts.

The post 65 may be affixed to the contact-assembly plate 68 in insulated relation thereto in any suitable manner. Thus, for example, the post lower end portion 66 may be of reduced diameter and may extend through a hole 67 in plate 68 of somewhat larger diameter, without contacting the edges of said hole. Absence of contact between post portion 66 and the metal bordering hole 67 may be insured by providing an annular recess 69 on the underside of plate 68 of larger diameter than and concentric with the hole 67, and then positioning an insulating washer 70, through which post portion 66 extends, within said recess. When the parts are all assembled, insulating washer 70 cannot shift laterally with respect to plate 68, and will thus hold post portion 66 out of contact with the plate metal.

On the opposite or upper side of plate 68, another insulating washer 71 may be provided to separate the metal of the connector lug 72 from that of the plate 68. The thus-insulated post 65 may be securely fastened in position by slipping metallic washer 73, which may be of smaller diameter than the insulating washer 70, over the lower end of portion 66 and then upsetting the latter portion over the inner edge of washer 73, all as shown in Figure 4. This construction may be quickly and easily assembled, and will not permit subsequent shifting of parts, except for rotational adjustment of post 65 about its longitudinal axis.

The other contact 64 is preferably carried at or near one end of a flexible spring 74, whose other end may be anchored relative to the contact-assembly plate 68 in any suitable manner. Thus, as illustrated in Figures 3 and 5, the anchored end of spring 74 may extend into a notch 75 formed in the vertical cylindrical side wall of a post 76 riveted in a hole 77 formed in plate 68, thus grounding spring 74 to the plate 68. Spring 74 may be held in the notch 75 in any suitable fashion, as for instance by staking the metal bordering said notch into tight frictional engagement with the end portion of spring 74. The basal portion of post 76 immediately above the plate 68 may be polygonally shaped as at 78, to provide turning means whereby post 76, and with it contact spring 74, may be rotatably adjusted about the longitudinal axis of said post.

The contact spring 74 selected for illustration is of substantially rectangular cross-section, although if desired this spring may be of round or other cross-section. The spring-supported contact element 64 may comprise an inserted or inlaid portion disposed within the overall outline of the spring 74 as illustrated in Figure 3, or if desired contact element 64 may comprise an outwardly projecting contact button somewhat similar to the forward end of fixed contact element 63. The meeting surface portions of these contact elements 63 and 64 are preferably made from a platinum-iridium alloy, while spring 74 may be made of beryllium copper or other good electrically-conducting spring metal. The thickness of contact spring 74 has been expressly exaggerated in the drawings for the sake of clarity. Actually this spring may be extremely thin, measuring approximately .0025 inch in thickness.

Disposed immediately alongside the contact spring 74 and cooperating therewith is an auxiliary pivotally-mounted lever 80, having two spaced spring-engaging side-projections 81 and 82 preferably disposed one ahead of, and the other behind, the pivot zone, to one side thereof. The forward end of lever 80 may be elongated and may terminate in a pointed tip 83 extending into the path of movement of an oscillating lever-actuating pin 84 secured in a roller 85 affixed to the balance staff 47. The opposite end 86 of lever 80, which preferably has sufficient mass to balance the lever, may be bent down as illustrated to conserve space. As more particularly illustrated in Figure 6, lever 80 may be pivotally supported in operative juxtaposition with a side portion of contact spring 74 by a pivot post 87 which may be securely affixed to the sub-assembly plate 68 by being riveted or staked thereto as at 91. A headed pivot-pin 88 may extend freely through the lever pivot-hole 89 and be press-fitted into the hole 90 in post 87 without binding the lever, so that the latter will be free to swing about its pivot point. Lever 80 may be made from any suitable more or less rigid material, as for example from sheet steel or the like.

As more particularly illustrated in Figures 3 and 7, the sub-assembly plate 68 which carries the contact assembly may be secured to the lower balance-bridge plate 40 in slightly spaced relation therefrom by means of screws 92 and 93 which respectively pass through openings 94 and 95 in plate 68, then through spacer sleeves 96 and 97 disposed intermediate plates 68 and 40, and then screw-threadedly engage threaded holes in plate 40. In order to permit of the ready adjustment of lever-tip 83 relative to the path of movement of its actuating pin 84, opening 95 in plate 68 through which screw 93 extends may be purposely enlarged or slotted, so that on loosening screws 92 and 93, the entire plate 68 may be pivotally adjusted about screw 92 as its pivot to bring lever-tip 83 more or less into the path of movement of pin 84, following which screws 92 and 93 may be re-tightened securely to clamp plate 68 in its newly-adjusted position.

That portion of plate 68 disposed immediately above screw 43 may be notched or cut away as illustrated in order to provide ready access to screw 43, so that the assembled balance, escape and contact-assembly portions of the movement may be quickly jointly withdrawn as a single unit by merely unscrewing screws 42 and 43.

Referring now more particularly to Figure 1, the electrical circuit of the illustrated clock will be seen to include a lead wire 98 connected to a tab 99 at one end of the coil 30, another lead wire 100 leading from the opposite end of said coil to the connector lug 72, and still another lead wire 101 grounded through the connector-lug 102 and pillar 23 to the frame of the clock movement. Assuming now that leads 98 and 101 are connected to a suitable source of current, when contacts 63 and 64 are closed, current will flow through field coil 30 along a path including elements 98, 99, 30, 100, 72, 65, 63, 64, 74, 76, 68 and thence through the frame of the movement to the grounded lead 101. This flow of current will magnetically energize pole-pieces 26 and 29. When contacts 63 and 64 are separated, the circuit through the field coil 30 is broken and the pole pieces become de-energized.

Contact spring 74 is preferably normally biased towards its auxiliary lever 80, so that the parts will ordinarily assume the "neutral" position shown in Figures 3, 9 and 11, wherein spring 74 presses against both lever side-projections 81 and 82. This biasing of spring 74 towards lever 80, which may be effected and controlled by turning post 76 (by means of its portion 78) relative to plate 68, fixes the neutral position of the lever to some predetermined location to which the lever will always be promptly and accurately returned by spring 74 whenever lever-tip 83 is not being acted on by the oscillating pin 84. In other words, no matter which way lever 80 may be turned from its neutral position, once pin 84 has released lever-tip 83, contact spring 74 which has theretofore been in contact with only one of the two side-projections 81 and 82 will, acting through said one projection, suddenly swing or twitch the lever back until the spring also contacts the second side-projection, in which latter or "neutral" position the spring and its auxiliary lever instantaneously come to rest.

When lever tip 83 is thereafter tilted in either direction, lever 80 will be swung correspondingly, thereby swinging one or the other of the side-projections 81 and 82, depending upon the direction of tilt, further to one side, thereby deflecting the contact spring 74. It will be noted that lever projections 81 and 82 engage the spring 74 at points spaced a relatively substantial distance apart along the length of said spring, with projection 81 being disposed nearer to the fixed end of said spring. Because of this closer proximity of projection 81 to the secured end of spring 74, equal lateral outward movement of projections 81 and 82 produces unequal deflection amplitudes at the free contact-bearing end of spring 74; projection 81 producing, for a given lateral movement, a greater movement of contact 64 than is produced by an equal lateral movement of projection 82.

Furthermore, in the preferred form lever projection 81 is spaced at a greater radial distance from the lever axis of pivotation than is the lever projection 82, so that for a given angular swing of lever 80 in one direction, projection 81 describes a longer arc than does projection 82 for an equal angular swing of lever 80 in the opposite direction. This further magnifies the movement of contact 64 caused by lever projection 81 as compared with that caused by lever projection 82.

As will be observed more particularly from Figures 3, 9 and 11, lever 80 in its neutral position has its tip 83 pointing not directly at the axis of the balance staff 47, but off to the right thereof. This offset relationship produces greater angular motion of auxiliary lever 80 in the forward clockwise or circuit-closing stroke of pin 84 than on the return counter-clockwise or open-circuit stroke thereof. Thus, as will be clearly seen from Figures 8 and 10, this offset provides engagement between pin 84 and lever tip 83 over a longer arc on the clockwise stroke, see Figure 8, than on the counter-clockwise stroke, see Figure 10; the neutral position from which lever-tip 83 was picked up by pin 84 traveling in either direction being indicated in dotted lines in both said views.

These three factors combined, namely the closer proximity of lever-projection 81 to the fixed end of spring 74, the larger radial spacing of lever-projection 81 from the pivot pin 83, and the offsetting of lever 80 relative to the balance staff 47, jointly provide far greater motion of contact 64 on the clockwise or circuit-closing stroke than on the counter-clockwise or open-circuit stroke. Thus, although contact 64 moves towards contact 63 on both clockwise and counter-clockwise strokes of the pin 84, the maximum movement on the counter-clockwise stroke is far short of that necessary to establish contact between 63 and 64, as shown in Figure 10, while being amply sufficient to establish such contact on the opposite clockwise stroke, as shown in Figure 8.

From the foregoing it will be evident that the lever 80 constitutes an actuator for pressing the movable contact 64 toward the other contact 63 against the action of the spring 74, that the balance wheel 46 constitutes an oscillator having an abutment in the form of pin 84 which wipes over the end 83 of the lever, which serves as a cooperative abutment. It will also be evident that the larger movement of the contact 64 when the oscillator swings the lever in a counterclockwise direction may result from any one or more of the following factors: the abutment on the actuator is offset from the plane containing the axes of the oscillator 46 and actuator 80; the locations at which the lever shoulders 81 and 82 engage the spring 74 are spaced different distances from the end of the actuator which constitutes the abutment cooperating with the abutment 84 on the oscillator; these two locations are spaced different distances from the actuator pivot 88; and the two locations are spaced different distances from the spring support 76. By utilizing one or more of these factors the contact 64 can be moved much farther when the oscillator swings clockwise than when it swings counterclockwise.

The rest position of the clock parts, which they will necessarily assume after the interruption of current through the failure or disconnection of the power source, is illustrated in Figure 1. In this position, hairspring 50 exerts sufficient force through the balance staff 47, roller 85 and pin 84 to deflect lever-tip 83 slightly from its neutral position causing lever-projection 81 to hold contact 64 in firm engagement with the contact 63, thus maintaining a complete circuit through field coil 30 in preparation for the reapplication of electrical energy to the leads 98 and 101. In this starting position it will be noted that the contact spring 74 is supported at both its ends, and is slightly bowed or deflected by the force of the hairspring 50 acting through the projection 81. Any further movement of pin 84 in the circuit-closing clockwise direction will be resisted by spring 74 (then fixed beam-wise at its two ends) to a greater degree and with more force than was the initial movement of pin 84 in carrying lever-tip 83 from its neutral position to the point shown in Figure 1 (the movable spring end then being for the most part free, and the spring acting on lever projection 81 in cantilever-wise fashion). In other words, on the clockwise stroke of pin 84, contact spring 74 exerts less reactive force on lever projection 81 as the contact gap is being closed than it exerts thereon immediately thereafter on continued clockwise movement, for the contact spring 74 has then changed from a relatively more resilient cantilever-type spring fixed at one end, to a relatively less-resilient beam-type spring fixed at both ends. This feature, plus other features some of which have already been described, give the clock of the present invention its good self-starting qualities, as will be explained more fully hereinafter.

Reverting now to Figure 1, if the flow of current through the leads 98 and 101 be restored, current will flow through the field coil 30 since contacts 63 and 64 are closed, causing the pole-pieces 26 and 29 magnetically to attract the then closely-adjacent balance armature 49. The resultant clockwise movement of armature 49, transmitted through the balance staff 47 and roller 85, causes pin 84 to sweep past the tip of the lever as shown in Figure 8, further tilting said lever and further bowing the contact spring 74. This increased bowing of spring 74, through foreshortening of its effective length, draws the movable contact 64 laterally across the surface of fixed contact 63 at least to some slight extent, producing a resultant self-cleaning wiping action between the two. This wiping action has been slightly exaggerated in Figure 8 for the sake of clarity. The impulse applied to the balance armature 49 by the sudden energization of the pole-pieces is of sufficient magnitude to overcome the resistive force exerted by contact spring 74 and carry pin 84 beyond the lever-tip 83. The instant pin 84 releases lever-tip 83, spring 74, which is always biased towards its auxiliary lever 80, springs to the right, instantaneously bringing the lever into the neutral position shown in Figure 9, and simultaneously abruptly withdrawing contact 64 from contact 63 thereby breaking the circuit through the field coil and demagnetizing the pole-pieces 26 and 29. The parts are preferably so arranged that this demagnetization of pole-pieces 26 and 29 occurs before they have had any opportunity to exert any retarding influence on the armature 49, which continues to move past these pole-pieces for a relatively substantial distance in a clockwise direction.

During this clockwise movement of the armature, the spiral hairspring 50 is wound up, a transfer of energy taking place from the balance to the hairspring until at the end of the clockwise stroke of the balance all the energy has been stored in the hairspring. At this point the balance, which may then be approximately in the position shown in Figure 9, starts on its return counter-clockwise stroke in response to the unwinding influence of the wound-up hairspring 50. On this return stroke, the balance armature 49 passes back between the field pole-pieces which are still de-energized, and when pin 84 reaches lever tip 83 which has been held in the neutral position shown in full in Figure 9 and in dotted lines in Figure 10 by the contact spring 74, it swings said lever-tip to the right for a relatively short distance to the position shown in full lines in Figure 10, at which latter point pin 84 is about to release lever-tip 83. This slight movement of lever tip 83 on the return stroke tilts said lever slightly, thereby causing lever-projection 82 to deflect spring 74 slightly to the left. The maximum deflection of contact spring 74 on the return stroke of the armature, however, is insufficient to close the gap between the contacts 63 and 64. This lesser deflection of contact spring 74 on the return or counter-clockwise stroke of the armature, as compared with the substantially greater deflection on the forward or clockwise stroke, is due, in this particular embodiment, to the combination of the three factors described more fully hereinabove, namely, the offset relationship of the lever tip with respect to the balance staff, the longer radius from the lever axis of pivotation to the tip of lever projection 81 as compared with the radius from said axis to the tip of lever projection 82, and the closer spacing of lever projection 81 relative to the fixed end of spring 74.

Following this slight idle deflection of lever-tip 83 on the counter-clockwise stroke of the balance, pin 84 moves past said lever-tip and continues to the end position shown in full lines in Figure 11, the lever upon release having been instantaneously returned by spring 74 to the neutral position shown in Figure 11 wherein the spring bears against both lever-projections 81 and 82. The armature comes to rest approximately in the position shown in full lines in Figure 11, the hairspring 50 then being partially expanded and having stored-up therein the energy received from the balance on its counter-clockwise stroke. The hairspring 50 then starts the balance on its forward or clockwise stroke, and when armature 49 comes within range of the field pole-pieces 26 and 29, the simultaneous deflection of contact spring 74 caused by pin 84 picking up and tilting lever-tip 83 brings contacts 63 and 64 together, completing the field coil circuit and magnetizing the field pole-pieces which then impart another clockwise magnetic impulse to armature 49 amply sufficient to carry the balance through its next complete cycle of operation.

In-and-out or longitudinal adjustment of lever 80 with respect to the path of movement of balance pin 84 may be effected by pivoting the sub-assembly plate 68 about screw 92, and affords means for varying the time interval during which the contacts remain closed on the clockwise stroke of pin 84. Thus, moving lever-tip 83 further in towards the balance staff 47, necessitates pin 84 moving through a longer arc on its clockwise stroke before it can release the tip of the lever 83, thus increasing the duration of the interval during which the contacts remain closed on said stroke; and conversely, shifting the lever-tip outwardly in the reverse direction has the opposite effect of shortening the duration of the interval during which the contacts remain closed. In this fashion, the moment at which contacts 63 and 64 will be separated can be adjusted for the most favorable position of balance armature 49 with respect to the field pole-pieces for de-energization of the latter.

One of the outstanding advantages of the present invention is the fact that the movement parts will, upon failure or disconnection of the power source, invariably come to rest in a closed-circuit condition, with pin 84 pressing against the right side of lever-tip 83 and contacts 63 and 64 closed, so that upon the re-application of power, the clock will automatically resume operation, that is to say it will self-start. This important feature may be attributed in this first embodiment to the following factors. The resisting moment of the contact spring is relatively greater on the clockwise stroke of the balance pin 84 than on its counter-clockwise stroke, because on the clockwise stroke spring 74 which then acts on lever-projection 81 applies a relatively greater force on the lever projection, and at a greater distance from the lever axis of pivotation than on the return or counter-clockwise stroke during which 82 is the lever-projection being acted on. This relatively greater resistive force of spring 74 on the clockwise stroke is due to the fact that the effective length of spring 74 from its anchored end to the point where it exerts its force on the lever is shorter on the clockwise stroke than on the counter-clockwise stroke, and also due to the relative stiffening of spring 74 with resultant increase in resistance to deflection once its outer contact-bearing end 64 abuts against the fixed contact 63, which latter condition occurs solely on the clockwise stroke.

Furthermore pin 84 on its clockwise stroke engages and exerts force against lever-tip 83 over a relatively greater arcuate distance and for a relatively greater length of time than on its counter-clockwise stroke, which means that of the total balance wheel energy which is lost during each complete cycle of operation a relatively greater portion is expended on the clockwise circuit-closing stroke than on the counter-clockwise open-circuit stroke. In other words, relatively more work is performed by the balance wheel on the clockwise stroke than on the counter-clockwise stroke.

In this connection, it should be noted that although reference is made to "relatively greater" portions of energy, and "relatively larger" resistive forces exerted by contact spring 74, actually the magnitudes involved are of an extremely small order, being relatively insignificant in comparison with the much more considerable amounts of energy available from, and the far greater forces exerted by, the balance system during actual operation of the movement. It is only after the power has been interrupted and the amplitude of oscillations of the balance has gradually diminished almost to the vanishing point that the relative difference in the amounts of energy expended by the moving balance on its clockwise and counter-clockwise strokes, and the relative difference in resistive forces exerted by contact spring 74 on clockwise and counter-clockwise strokes of the balance, become of importance and determinative of the final rest position of pin 84 with respect to lever-tip 83.

The amount of bias of hairspring 50 relative to lever-tip 83, although sufficient to keep the contacts 63 and 64 firmly closed in the at-rest position shown in Figure 1, should nevertheless preferably be small enough so that when balance pin 84 is swung manually into the position shown in full lines in Figure 8, just permitting lever-tip 83 to be returned to its neutral position, hairspring 50 will have passed through its own unstressed position and assumed a reverse bias of sufficient magnitude to carry pin 84 past lever-tip 83 in a counter-clockwise direction upon release of the balance, which must then come to rest in the self-starting position.

Aside from the foregoing advantages of assured self-starting, and circuit-closing solely on forward strokes of the balance notwithstanding the fact that pin 84 actuates lever 80 on both forward and return strokes, the present invention also eliminates any direct engagement between the contact spring and the oscillating element. By thus avoiding direct contact between spring 74 and pin 84, frictional wear on the former, which would otherwise be considerable, is avoided. In the foregoing embodiment of the present invention, pin 84 instead of working directly on spring 74 works on the auxiliary lever 80, which may be sturdily constructed to withstand prolonged periods of use without breakdown. Lever 80 acts as an intermediary between pin 84 and spring 74, actuating the latter in response to movements of the former with a minimum amount of frictional wear on the spring.

Another outstanding advantage of the present invention is the fact that the contact spring 74 is never left free to vibrate or chatter as in prior-art constructions, being fully supported and controlled at all times through its physical contact with relatively fixed vibration-free parts towards which it is constantly biased. This arrangement completely eliminates spring flutter, and with it the highly undesirable rapid closing and opening, or chattering, of contacts and accompanying adverse effect on time-rate of the movement and on the life of the contacts. The hereinabove-described construction also provides sudden and certain opening and closing of the contacts, which materially increases their life making possible long-continued operation of the movement.

Furthermore the use of a lever having a relatively long arm acting in conjunction with the balance wheel and a relatively shorter arm or arms acting in conjunction with the contact spring makes possible the achievement of that long sought, but never heretofore realized, advantageous combination of good contact pressures with free balance wheel action, which makes for certainty and smoothness of operation and for good self-starting.

The embodiment shown in Figures 12 and 13 constitutes a refinement over that illustrated in Figure 3 and differs therefrom primarily in the manner in which the spring anchorage post 76 is mounted. In this embodiment, parts which are identical with those illustrated in Figure 3 have been assigned the same numerals. In the former embodiment, this anchorage post was mounted directly on plate 68, and was merely rotatably adjustable about its own longitudinal axis thereby simultaneously to vary the contact pressure between spring 74 and lever projections 81 and 82, and to a limited degree the lateral position of lever-tip 83. In this Figure 12 embodiment, however, anchorage post 76, while still rotatably adjustable about its own longitudinal axis to vary spring pressure against the lever-projections, is mounted on a separate arm 103 which is rotatably adjustable about the shank 104 of the lever-supporting pivot-post 105, to which lever 80 is pinned by the pivot-pin 88. The contact-assembly plate 168 may terminate short of the anchorage post 76 to permit rotational adjustment of arm 103 without interference between the staked or riveted underside of said post with the plate 168. The shank 104 of the pivot post 105 may be of reduced diameter and may extend through aligned holes in the arm 103 and plate 168, with its lowermost portion being staked or riveted firmly to secure the parts together. Arm 103 is preferably held in position with sufficient tightness to insure of its immobility in all of its adjusted positions during operation of the clock, and yet not so tightly as to prevent the rotational adjustment thereof about post 105. It is to be understood that the herein-described means for securing post 105, arm 103 and plate 168 together, represents only one of the many possible ways in which this can be effected, and that the invention is not limited to this or indeed any other illustrated or described manner of securement of parts.

If arm 103 be pivoted about its secured end from the position shown in Figure 12 to some new position, the contact spring 74, which during this adjustment remains fixed relative to the arm 103, will be rotated about the axis of pivot pin 105 by a corresponding amount, rotating with its lever 80 (towards which it is biased). This causes lever-tip 83 to shift laterally, whereby the degree of offset of said tip with respect to balance-staff 47 may be adjusted without varying the pressure of spring 74 on lever 80. In this fashion, the ratio of lever-motion on the clockwise circuit-closing stroke to that on the counter-clockwise open-circuit stroke may be adjusted at will without disturbing the bias of spring 74 towards lever 80. This lateral adjustment of lever-tip 83 may introduce a slight variation in the contact gap, which may be compensated for by screw-threadedly advancing or retracting contact-element 63 in its supporting-post 65, or if desired means may be provided for bodily adjusting the position of the contact-post 65 relative to the plate 168. In this Figure 12 embodiment therefore, lever-tip 83 may be laterally adjusted between wide limits without varying the pressure of spring 74 against lever 80, thus differing from the Figure 3 embodiment wherein only limited lateral adjustment of lever-tip 83 could be effected and that only by turning spring-anchorage post 76 with resultant change in pressure of spring 74 against lever 80. In this Figure 12 embodiment (like in the Figure 3 embodiment) lever-tip 83 may be shifted longitudinally closer towards or further away from the balance staff 47 by loosening plate-securing screws 92 and 93 and then pivotally adjusting plate 168 about screw 92 as a pivot, slot 95 permitting plate 168 to be shifted relative to screw 93.

The embodiment illustrated in Figure 14 is similar to that shown in Figure 3 except for the reversal in position of the contact spring. Thus, in the Figure 14 embodiment, contact spring 174 has the end thereof remote from balance-staff 47 secured in the anchorage post 176, and bears the contact 164 at the end nearest said balance-staff, representing a transposal in positions of the spring anchorage post and the insulated contact post. Although in this particular embodiment, lever-projection 81 is further away from anchorage post 176 than lever-projection 82, yet the offsetting of lever-tip 83 with respect to balance-staff 47, the longer radius from pivot-pin 88 to lever-projection 81 than to lever-projection 82, and the relative stiffening of spring 174 when contacts 164 and 163 come into abutment on the clockwise stroke of pin 84, are amply sufficient to provide firm contact closure on said clockwise stroke, continuous open-contact condition throughout the counter-clockwise stroke, and extremely reliable self-starting. In all other respects the Figure 14 embodiment is like the one shown in Figure 3, and operates in a similar manner.

The embodiment illustrated in Figure 15 is similar to that shown in Figure 14 except for the character and condition of the contact spring. In this Figure 15 embodiment, the contact spring 274 may be much more flexible than the spring 174 of Figure 14, and is substantially bowed when the parts are in the neutral position, as shown in full lines in Figure 15. This substantial bowing of spring 274 may be effected by rotating the spring anchorage post 276 not only through an angle sufficient to bring the contact spring up against the side-projections 81 and 82 of its auxiliary lever 80, but through a further angle sufficient to bow said spring by the relatively substantial amount shown in Figure 15. The force with which spring 274 resists tilting of lever 80 in either direction need be no greater than in the Figure 14 embodiment, and in fact may even be substantially less if spring 274 be made of sufficiently flexible material.

As will be clearly apparent from Figure 15, tilting of lever 80 on the clockwise stroke of balance-pin 84 firmly closes contacts 264 and 63, as shown in dashed-dotted lines, whereas on the counter-clockwise stroke, although lever-projection 82 tends to move the juxtaposed portion of spring 274 slightly in a contact-closing direction, the withdrawal of lever projection 81 from the bowed contact-spring permits said spring to unbow and straighten itself out and assume substantially the position shown in dashed lines, so that the net effect on contact 264 during the counterclockwise stroke of balance-pin 84 is to further withdraw it from fixed contact 63, or at least not to bring it any closer to said fixed contact. Through the use of a sufficiently flexible contact spring 274, the extent of its bowing may be varied between relatively wide limits by turning post 276, thereby providing simple means for effecting substantial lateral adjustment of lever-tip 83. The arrangement of Figure 15 also provides relatively greater pressure between contacts, which is of importance in preventing open-circuiting due to spring creep in the at-rest position of the parts. Longitudinal adjustment of lever-tip 83 in this Figure 15 embodiment may be effected in the same manner as in the embodiments shown in Figure 3, 12 and 14.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what is hereby claimed as new and desired to be secured by Letters Patent is:

1. In an electric clock or the like having an oscillatory element arcuately movable about a fixed axis and electromagnetic means for oscillating said element about said axis, a circuit for the electromagnetic means, a switch for controlling said circuit, an elongated flexible spring controlling said switch, said spring being anchored at one end, a pivotally mounted lever alongside said spring having a tip portion swingable through an arc intersecting the arcuate path of movement of said oscillating element, said spring being biased toward said lever and in engagement therewith at two separate and distinct zones spaced along the length of said spring at unequal distances from its anchored end and disposed at unequal radial distances from the lever axis of pivotation, the zone nearest the anchored end of the spring being at the greatest distance from the lever axis of pivotation, said spring tending to hold the lever in a neutral position wherein its tip portion lies within the path of movement of said oscillating element and wherein a line drawn from the lever axis of pivotation through said tip portion is offset with respect to the oscillation axis of said oscillatory element, so that on opposite strokes of the latter said lever will be tilted in opposite directions by unequal amounts, the spring being deflected through the engagement zone nearest its anchored end and furthest from the lever axis of pivotation to close the circuit on that stroke during which the lever is tilted by the greatest amount.

2. In an electric clock or the like having an oscillatory element arcuately movable about a fixed axis and electromagnetic means for oscillating said element about said axis, a circuit for the electromagnetic means, a switch for controlling said circuit, an elongated flexible spring controlling said switch, a pivotally mounted lever alongside said spring having a tip portion swingable through an arc intersecting the arcuate path of movement of said oscillating element, said spring being biased toward said lever and in engagement therewith at two separate and distinct zones disposed at unequal radial distances from the lever axis of pivotation, and tending to hold said lever in a neutral position wherein its tip portion lies within the path of movement of said oscillating element and wherein a line drawn from the lever axis of pivotation through its tip portion is offset with respect to the oscillation axis of said oscillatory element, so that on opposite strokes of the latter the lever will be tilted in opposite directions by unequal amounts, the spring being deflected through the engagement zone furthest from the lever axis of pivotation to close the circuit on that stroke during which the lever is tilted by the greatest amount.

3. In an electric clock or the like having an oscillatory element arcuately movable about a fixed axis and electromagnetic means for oscillating said element about said axis, a circuit for the electromagnetic means, a switch for controlling said circuit, an elongated flexible spring controlling said switch, said spring being anchored at one end, a pivotally mounted lever alongside said spring having a tip portion swingable through an arc intersecting the arcuate path of movement of said oscillating element, said spring being biased toward said lever and in engagement therewith at two separate and distinct zones spaced along the length of said spring at unequal distances from its anchored end, said spring tending to hold said lever in a neutral position wherein its tip portion lies within the path of movement of said oscillating element and wherein a line drawn from the lever axis of pivotation through its tip portion is offset with respect to the oscillation axis of said oscillatory element, so that on opposite strokes of the latter the lever will be tilted in opposite directions by unequal amounts, the spring being deflected through the engagement zone nearest its anchored end to close the circuit on that stroke during which the lever is tilted by the greatest amount.

4. In an electric clock or the like having an oscillatory element and electromagnetic means for oscillating said element, a circuit for the electromagnetic means, a switch for controlling said circuit, an elongated flexible spring controlling said switch, said spring being anchored at one end, a pivotally mounted lever alongside said spring having a tip portion swingable through an arc intersecting the path of movement of said oscillating element, said spring being biased toward said lever and in engagement therewith at two separate and distinct zones spaced along the length of said spring at unequal distances from its anchored end and at unequal radial distances from the lever axis of pivotation, the zone nearest the anchored end of the spring being at the greatest distance from the lever axis of pivotation, said spring tending to hold said lever in a neutral position wherein its tip portion lies within the path of movement of said oscillating element so that on opposite strokes of the latter the lever will be tilted in opposite directions, closure of the circuit through said electromagnetic means occurring when the spring is deflected through the engagement zone nearest the anchored end of said spring and furthest from the lever axis of pivotation.

5. In an electric clock or the like having an oscillatory armature and electromagnetic means for oscillating said armature, a circuit for the electromagnetic means, a switch for controlling said circuit, an elongated flexible spring controlling said switch, a support for said spring, a pivotally mounted lever alongside said spring, said spring being biased toward said lever and engaging the latter at two separate and distinct engagement zones disposed at unequal radial distances from the lever axis of pivotation, the engagement zone farther from said axis being nearer to said support, said circuit then being open, and a lever-tilting element oscillating with said armature and arranged to tilt said lever in opposite directions on opposite strokes thereby to deflect said spring through force transmitted first through one and then the other of said engagement zones, circuit closure occurring solely when the spring is deflected through the engagement zone furthest from the lever axis of pivotation.

6. In an electric clock or the like having an oscillatory armature and electromagnetic means for oscillating said armature, an elongated spring fixed at one end and having its other end free, a pair of contact portions controlling the flow of current through said electromagnetic means, one of said contact portions being disposed at the free end of said spring, a pivotally mounted lever alongside said spring arranged to act thereon intermediate its two ends, the lever being unattached to the spring but pressing its contact portion toward the other contact portion when swung in either direction about its pivot, the lever and spring having abutting surfaces whereby the spring returns the lever to a neutral position, wherein said contact portions are separated, after the lever has been tilted in either direction from said neutral position, a driving element oscillating with said armature, a portion of said lever extending into the path of movement of said driving element and arranged to be moved thereby in opposite directions on opposite strokes to cause the lever to tilt in opposite directions on opposite strokes, said driving element and said lever being so arranged that the lever will be tilted through a greater angle on one stroke than on the reverse stroke thereby to cause greater movement of said spring on said one stroke than on said reverse stroke, the motion of said lever when tilting through the greater angle being sufficient not only to close the aforesaid contact portions but further to deflect said spring intermediate its secured end and its then momentarily-fixed contact end.

7. In an electric clock or the like having an oscillatory armature and electromagnetic means for oscillating said armature, an elongated spring fixed at one end and having its other end free, a pair of contact portions controlling the flow of current through said electromagnetic means, one of said contact portions being disposed at the free end of said spring, a pivotally mounted lever alongside said spring, the spring being biased toward said lever and the spring intermediate its two ends engaging said lever at two separate and distinct engagement zones disposed at unequal radial distances from the lever axis of pivotation, said circuit then being open, tilting of said lever in one direction causing said spring to flex through force transmitted through one of said engagement zones and tilting of said lever in the opposite direction causing said spring to flex through force transmitted through the other of said engagement zones, a driving element oscillating with said armature, a portion of said lever extending into the path of movement of said driving element and arranged to be moved thereby in opposite directions on opposite strokes to cause said lever to tilt in opposite directions on opposite strokes, closure of said circuit occurring solely on that stroke during which the tilted lever deflects the spring through the engagement zone farthest from the lever axis of pivotation, the spring on that stroke being deflected by an amount not only sufficient to close the aforesaid contact portions but further to cause said spring to bow intermediate its secured end and its then momentarily-fixed contact end.

8. In an electric clock or the like having an oscillatory armature and electromagnetic means for oscillating said armature, an elongated spring fixed at one end and having its other end free, a pair of contact portions controlling the flow of current through said electromagnetic means, one of said contact portions being disposed at the free end of said spring, a pivotally mounted lever alongside said spring, the spring being biased toward said lever and the spring intermediate its two ends engaging said lever at two separate and distinct engagement zones disposed one ahead of, and the other behind, the lever axis of pivotation, said circuit then being open, tilting of said lever in one direction causing said spring to flex through force transmitted through one of said engagement zones and tilting of said lever in the opposite direction causing said spring to flex through force transmitted through the other of said engagement zones, a driving element oscillating with said armature, a portion of said lever extending into the path of movement of said driving element and arranged to be moved thereby in opposite directions on opposite strokes to cause said lever to tilt in opposite directions on opposite strokes, the spring being deflected, on one of said strokes, by an amount sufficient not only to close the aforesaid contact portions but further to cause said spring to bow intermediate its secured end and its then momentarily-fixed contact end.

9. In an electrical clock or the like having a rotatably oscillatory armature and electromagnetic means for oscillating said armature, an elongated flexible spring, a pair of contact portions controlling the circuit through said electromagnetic means, one of said contact portions being carried on said spring, a pivotally mounted lever alongside said spring arranged to flex the latter to bring said contact portions into engagement when itself tilted, said spring being biased toward said lever and tending to hold it in a predetermined neutral position with the contact portions separated, a lever-actuating element rotatably oscillating with said armature, the tip of said lever extending into the arcuate path of movement of said oscillating element whereby the lever will be tilted by said element to flex said spring, the lever-actuating element having an arcuate stroke sufficiently long for it to pass beyond the tip of the tilted lever on opposite strokes, said spring returning said lever to its neutral position the instant the lever tip has been released by said lever-actuating element, adjustment means whereby the lever may be shifted longitudinally to bring its tip more or less into the path of movement of its actuating element thereby to increase or decrease the time interval during which the contact portions remain in engagement, and adjustment means whereby the neutral position of the lever tip may be shifted laterally without varying the bias of said spring towards said lever thereby to vary the point at which said lever-actuating element first comes into engagement with said lever tip on its opposite strokes.

10. In an electrical clock or the like having an oscillatory armature and electromagnetic means for oscillating said armature, an elongated flexible spring anchored at one end, a pair of juxtaposed contact portions controlling the circuit through said electromagnetic means, one of said contact portions being carried at the end of said spring opposite its anchored end, a pivotally mounted lever disposed alongside of and actuating said spring, said lever bearing two projections extending therefrom on the side nearest said spring, said projections being spaced apart along the length of said lever one ahead of and the other behind the lever axis of pivotation, the spring being biased toward said lever and pressing with its intermediate portion against the two spaced lever projections and being relatively substantially bowed therebetween, tilting of said lever in opposite directions causing the lever projection farthest from the anchored end of said spring to move laterally in substantially opposite directions, movement of said latter projection in the direction of said spring causing said spring to bow still further to close the gap between said contact portions, and movement of the aforesaid projection in the opposite direction away from said spring permitting said spring to unbow thereby to widen said gap, and an element oscillating with said armature and arranged to tilt said lever in opposite directions on opposite strokes, whereby the circuit through said electromagnetic means will be momentarily closed on only one stroke of said armature and will remain open on the return stroke.

11. In apparatus of the character referred to the combination of a switch comprising two contact members one member of which is movable toward and from the other member, a spring urging the movable contact member away from the other contact member, a pivoted actuator for moving the movable contact member toward the other contact member against the action of said spring, the actuator being unattached to the movable contact member but moving it toward the other contact member when swung in either direction about its pivot, the spring and actuator having abutting surfaces whereby the spring returns the actuator to a neutral position, wherein said switch is open, after the actuator has been deflected in either direction from the neutral position, and an oscillator oscillating back and forth about a pivot point for swinging said actuator back and forth, the oscillator having an abutment which wipes over an abutment on the actuator in each direction of oscillation, the axes of the oscillator and actuator being disposed substantially in the same plane, the abutment on the actuator being offset from said plane so that the actuator has a relatively large movement from its neutral position when the oscillator oscillates in one direction and a smaller movement when the oscillator oscillates in the other direction, and means supporting the two contact members in spaced relationship to permit the switch to close in response to said large movement but not in response to said smaller movement.

12. In apparatus of the character referred to the combination of a switch comprising two contact members one member of which is movable toward and from the other member, a spring urging the movable contact member away from the other contact member, a pivoted actuator for moving the movable contact member toward the other contact member against the action of said spring, the actuator being unattached to the movable contact member but moving it toward the other contact member when swung in either direction about its pivot, and an oscillator oscillating back and forth about a pivot point for swinging said actuator back and forth, the oscillator having an abutment which wipes over an abutment on the actuator in each direction of oscillation, the spring and actuator abutting each other at locations on opposite sides of the actuator pivot lengthwise of the spring so that the spring normally holds the actuator in a neutral position in which the switch is open and returns the actuator to this position after it is swung in either direction therefrom, the actuator operating on the spring at one of said locations when swung in one direction and at the other location when swung in the other direction, said locations being spaced from said actuator abutment different distances so that the actuator has a relatively large movement from its neutral position when the oscillator oscillates in one direction and a smaller movement when the oscillator oscillates in the other direction, and means supporting the two contact members in spaced relationship to permit the switch to close in response to said large movement but not in response to said smaller movement.

13. In apparatus of the character referred to the combination of a switch comprising two contact members one member of which is movable toward and from the other member, a spring urging the movable contact member away from the other contact member, a pivoted actuator for moving the movable contact member toward the other contact member against the action of said spring, the actuator being unattached to the movable contact member but moving it toward the other contact member when swung in either direction about its pivot, and an oscillator oscillating back and forth about a pivot point for swinging said actuator back and forth, the oscillator having an abutment which wipes over an abutment on the actuator in each direction of oscillation, the spring and actuator abutting each other at locations on opposite sides of the actuator pivot lengthwise of the spring so that the spring normally holds the actuator in a neutral position in which the switch is open and returns the actuator to this position after it is swung in either direction therefrom, the actuator operating on the spring at one of said locations when swung in one direction and at the other location when swung in the other direction, said locations being spaced from said actuator pivot different distances so that the actuator has a relatively large movement from its neutral position when the oscillator oscillates in one direction and a smaller movement when the oscillator oscillates in the other direction, and means supporting the two contact members in spaced relationship to permit the switch to close in response to said large movement but not in response to said smaller movement.

14. In apparatus of the character referred to the combination of a switch comprising two contact members one member of which is movable toward and from the other member, a spring urging the movable contact member away from the other contact member, a pivoted actuator for moving the movable contact member toward the other contact member against the action of said spring, the actuator being unattached to the movable contact member but moving it toward the other contact member when swung in either direction about its pivot, and an oscillator oscillating back and forth about a pivot point for swinging said actuator back and forth, the oscillator having an abutment which wipes over an abutment on the actuator in each direction of oscillation, the spring and actuator abutting each other at locations on opposite sides of the actuator pivot lengthwise of the spring so that the spring normally holds the actuator in a neutral position in which the switch is open and returns the actuator to this position after it is swung in either direction therefrom, the actuator operating on the spring at one of said locations when swung in one direction and at the other location when swung in the other direction, said locations being spaced differently in relation to said actuator abutment and also in relation to the actuator pivot so that the actuator has a relatively large movement from its neutral position when the oscillator oscillates in one direction and a smaller movement when the oscillator oscillates in the other direction, and means supporting the two contact members in spaced relationship to permit the switch to close in response to said large movement but not in response to said smaller movement.

15. In apparatus of the character referred to the combination of a switch comprising two contact members one member of which is movable toward and from the other member, a spring urging the movable contact member away from the other contact member, a support rigidly holding the spring at a point offset from the contact point of the movable contact member lengthwise of the spring, a pivoted actuator for moving the movable contact member toward the other contact member against the action of said spring, the actuator being unattached to the movable contact member but moving it toward the other contact member when swung in either direction about its pivot, and an oscillator oscillating back and forth, the oscillator having an abutment which wipes over an abutment on the actuator in each direction of oscillation, the spring and actuator abutting each other at locations on opposite sides of the actuator pivot lengthwise of the spring so that the spring normally holds the actuator in a neutral position in which the switch is open and returns the actuator to this position after it is swung in either direction therefrom, the actuator operating on the spring at one of said locations when swung in one direction and at the other location when swung in the other direction, said locations being spaced from said spring support different distances, whereby the actuator has a relatively large movement from its neutral position when the oscillator oscillates in one direction and a smaller movement when the oscillator oscillates in the other direction, and means supporting the two contact members in spaced relationship to permit the switch to close in response to said large movement but not in response to said smaller movement.

16. In apparatus of the character referred to the combination of a switch comprising two contact members one member of which is movable toward and from the other member, a spring urging the movable contact member away from the other contact member, a support rigidly holding the spring at a point offset from the contact point of the movable contact member lengthwise of the spring, a pivoted actuator for moving the movable contact member toward the other contact member against the action of said spring, the actuator being unattached to the movable contact member but moving it toward the other contact member when swung in either direction about its pivot, and an oscillator oscillating back and forth about a pivot point for swinging said actuator back and forth, the oscillator having an abutment which wipes over an abutment on the actuator in each direction of oscillation, the spring and actuator abutting each other at locations on opposite sides of the actuator pivot lengthwise of the spring so that the spring normally holds the actuator in a neutral position in which the switch is open and returns the actuator to this position after it is swung in either direction therefrom, the actuator operating on the spring at one of said locations when swung in one direction and at the other location when swung in the other direction, said locations being differently spaced relatively to said actuator abutment and relatively to the actuator pivot and relatively to said spring support and the actuator abutment being offset from the plane containing the axes of the oscillator and actuator, whereby the actuator has a relatively large movement from its neutral position when the oscillator oscillates in one direction and a smaller movement when the oscillator oscillates in the other direction, and means supporting the two contact members in spaced relationship to permit the switch to close in response to said large movement but not in response to said smaller movement.

ARTHUR B. SPERRY.
NICHOLAS NAZAR.
WILLIAM C. ERWIN.